US011896536B2

(12) United States Patent
Villarreal Suarez et al.

(10) Patent No.: US 11,896,536 B2
(45) Date of Patent: Feb. 13, 2024

(54) WHEELCHAIR SYSTEMS AND METHODS TO FOLLOW A COMPANION

(71) Applicant: Toyota Motor North America, Inc., Plano, TX (US)

(72) Inventors: Dario Jose Villarreal Suarez, Farmers Branch, TX (US); Sarah Darrow, The Colony, TX (US); Douglas A. Moore, Fairview, TX (US); Christopher Lee, Little Elm, TX (US)

(73) Assignee: Toyota Motor North America, Inc., Plano, TX (US)

( * ) Notice: Subject to any disclaimer, the term of this patent is extended or adjusted under 35 U.S.C. 154(b) by 630 days.

(21) Appl. No.: 17/091,559

(22) Filed: Nov. 6, 2020

(65) Prior Publication Data

US 2022/0142832 A1    May 12, 2022

(51) Int. Cl.
*A61G 5/02* (2006.01)
*G06V 40/16* (2022.01)
*G06V 20/56* (2022.01)

(52) U.S. Cl.
CPC .............. *A61G 5/024* (2013.01); *A61G 5/022* (2013.01); *G06V 20/56* (2022.01); *G06V 40/174* (2022.01)

(58) Field of Classification Search
CPC .... A61G 5/024; A61G 5/022; A61G 2203/22; A61G 2203/72; A61G 5/04; G06V 20/56; G06V 40/174; G05D 2201/0206; G05D 1/0246
USPC ........................................................... 701/2
See application file for complete search history.

(56) References Cited

U.S. PATENT DOCUMENTS

| 8,909,370 B2 | 12/2014 | Stiehl et al. |
| 10,369,699 B2 | 8/2019 | Maisonnier et al. |

(Continued)

FOREIGN PATENT DOCUMENTS

| JP | 2010172548 | * | 8/2010 |
| JP | 2010172548 A | | 8/2010 |
| WO | WO2014057501 | * | 4/2014 |
| WO | 2019161064 A1 | | 8/2019 |

OTHER PUBLICATIONS

Arai et al. ( "Robotic Wheelchair moving with multiple Companions", The 23rd IEEE International symposium on Robot and Human Interactive communication, Aug. 25-29, 2014, Edinburgh, Scotland, US, pp. 513-518) (Year: 2014).*

(Continued)

*Primary Examiner* — Muhammad Shafi
(74) *Attorney, Agent, or Firm* — Dinsmore & Shohl LLP

(57) ABSTRACT

Systems and methods of wheelchair systems having a companion control mode are disclosed. The wheelchair system includes a companion and a wheelchair. The wheelchair includes one or more wheels, at least one actuator coupled to the one or more wheels, a processing device, and a non-transitory, processor-readable storage medium in communication with the processing device. The non-transitory, processor-readable storage medium includes one or more programming instructions that, when executed, cause the processing device to determine the companion, generate a companion profile based on the determined companion, determine a movement of the companion, and actuate the at least one actuator to drive the one or more wheels to follow the movement of the companion. The actuation of the at least one actuator to drive the one or more wheels to follow the movement of the companion is an autonomous control.

16 Claims, 6 Drawing Sheets

(56) References Cited

U.S. PATENT DOCUMENTS

| | | |
|---|---|---|
| 10,661,433 B2 | 5/2020 | Angle et al. |
| 2018/0345479 A1 | 12/2018 | Martino et al. |
| 2019/0388647 A1* | 12/2019 | Bender .................. G06F 3/011 |
| 2020/0093092 A1 | 3/2020 | Soug |

OTHER PUBLICATIONS

Al Mamun et al. ("Companion Following Robotic Wheelchair with Bus Boarding Capabilities", 2018 Joint 7th International Conference of Informatics, electronics and Vision (ICIEV) and 2018 2nd International Conference on Imaging, Vision and Pattern Recognition (icIVPR), IEEE, 2018, pp. 174-179) (Year: 2018).*

International Search Report and Written Opinion for application PCT/US2021/072273 dated Feb. 23, 2022 (37 pages).

Mamun Shamim Al et al: "Companion Following Robotic Wheelchair with Bus Boarding Capabilities", 2018 Joint 7th International Conference on Informatics, Electronics & Vision (ICIEV) And 2018 2nd International Conference on Imaging, Vision & Pattern Recognition (ICIVPR), IEEE, Jun. 25, 2018 (Jun. 25, 2018), pp. 174-179, downloaded Mar. 10, 2022 from IEEE Xplore.

"Robotic Wheelchair Easy to Move and Communicate with Companions"; CHI 2013: Changing Perspectives, Paris, France; 4 pages; https://www.researchgate.net/publication/262388871_Robotic_wheelchair_easy_to_move_and_communicate_with_companions.

Masaya Arai et. al.; "Robotic Wheelchair Moving with Multiple Companions"; 6 pages; https://ieeexplore.ieee.org/document/6926304.

* cited by examiner

WHEELCHAIR SYSTEMS AND METHODS TO FOLLOW A COMPANION

TECHNICAL FIELD

The present disclosure generally relates to wheelchairs and, more specifically, to wheelchair systems that enable autonomously motion control when a companion is moving along side of the wheelchair.

BACKGROUND

Wheelchairs, such as power wheelchairs, enable those who are unable to walk on their own travel from one place to another. One type of wheelchair is a power wheelchair having one or more motors that allow a user to control the power wheelchair so that it moves under motorized control. Typically, a joystick or other user input device is used by the user to control the motors of the power wheelchair to navigate the environment. Some power wheelchairs have a "follow" feature that use sensors to autonomously control the power wheelchair to follow another person that is either in front of or behind the power wheelchair. However, it is difficult for the user of the power wheelchair and a followed companion to carry on a conversation because the companion has to be either in front of or behind the power wheelchair in the follow mode.

Accordingly, a need exists for alternative power wheelchairs that enable a followed companion that is positioned on a side of the wheelchair.

SUMMARY

In one embodiment, a wheelchair system includes a companion and a wheelchair. The wheelchair includes one or more wheels, at least one actuator coupled to the one or more wheels, a processing device, and a processor-readable storage medium in communication with the processing device. The processor-readable storage medium includes one or more programming instructions that, when executed, cause the processing device to generate a companion profile based on a plurality of identifying features of a determined companion, determine a movement of the companion, and actuate the at least one actuator to drive the one or more wheels to follow the movement of the companion. The actuation of the at least one actuator to drive the one or more wheels to follow the movement of the companion is an autonomous control.

In another embodiment, a wheelchair system includes a companion and a wheelchair. The wheelchair includes a frame, one or more wheels coupled to the frame, at least one actuator coupled to the one or more wheels, and a control unit. The control unit controls the wheelchair between a standard mode and a companion control mode such that in the companion control mode, the control unit actuates the at least one actuator to drive the one or more wheels to follow a movement of the companion. The actuation of the at least one actuator to drive the one or more wheels to follow the movement of the companion is an autonomous control.

In yet another embodiment, a method of operating a wheelchair includes receiving, by a control unit, an input from a user, the input corresponding to a request for a companion control mode, determining, by the control unit, a companion, determining, by the control unit, a movement of the companion, and actuating, by the control unit, at least one actuator to drive one or more wheels of the wheelchair to follow the movement of the companion.

These and additional objects and advantages provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The systems and methods described herein generally relate to a powered wheelchair configured with a companion follow mode. The companion follow mode permits autonomous motor control to follow a companion traveling along side of the powered wheelchair. As such, the powered wheelchair, in the companion follow mode, autonomous mimics or follows the companions movements along the side of the powered wheelchair. Further, the companion may be identified via a companion profile. The companion profile may include data related to the color of pants of the companion, facial recognition of the companion, and/or a cadence of a walk of the companion. As such, the companion profile establishes who is the proposed companion to follow. Further, any background noise surrounding the companion is eliminated such that the system may only focus on the movements of the determined companion. Additionally, the powered wheelchair includes a plurality of sensors that detect undesirable objects in front of the a powered wheelchair and will automatically exit from the companion follow mode if contact with the undesirable object is inevitable.

Present power wheelchairs do not have a companion follow mode activated to follow a companion along a side of the powered wheelchair, which may make it difficult for a user have a conservation with the companion. As a non-limiting example, the user may wish to engage in a conservation with the companion at the supermarket. Present power wheelchairs would force the companion to walk behind and/or in front of the Present power wheelchair. Others may not establish the companion based on facial recognition, cadence, and/or clothing color and thus mistake another person as the companion.

Embodiments solve this problem by generating a companion profile to establish the determined companion and following the determined companion as the companion moves along side of the powered wheelchair. Thus, the user is able to freely have a conversation with the companion while the powered wheelchair moves autonomously following the movements of the companion.

Various embodiments of power wheelchairs companion follow mode are described in detail herein.

As used herein, the term "communicatively coupled" may mean that coupled components are capable of exchanging data signals with one another such as, for example, electrical signals via conductive medium or a non-conductive medium, though networks such as via Wi-Fi, Bluetooth, and the like, electromagnetic signals via air, optical signals via optical waveguides, and the like.

Figure 1:
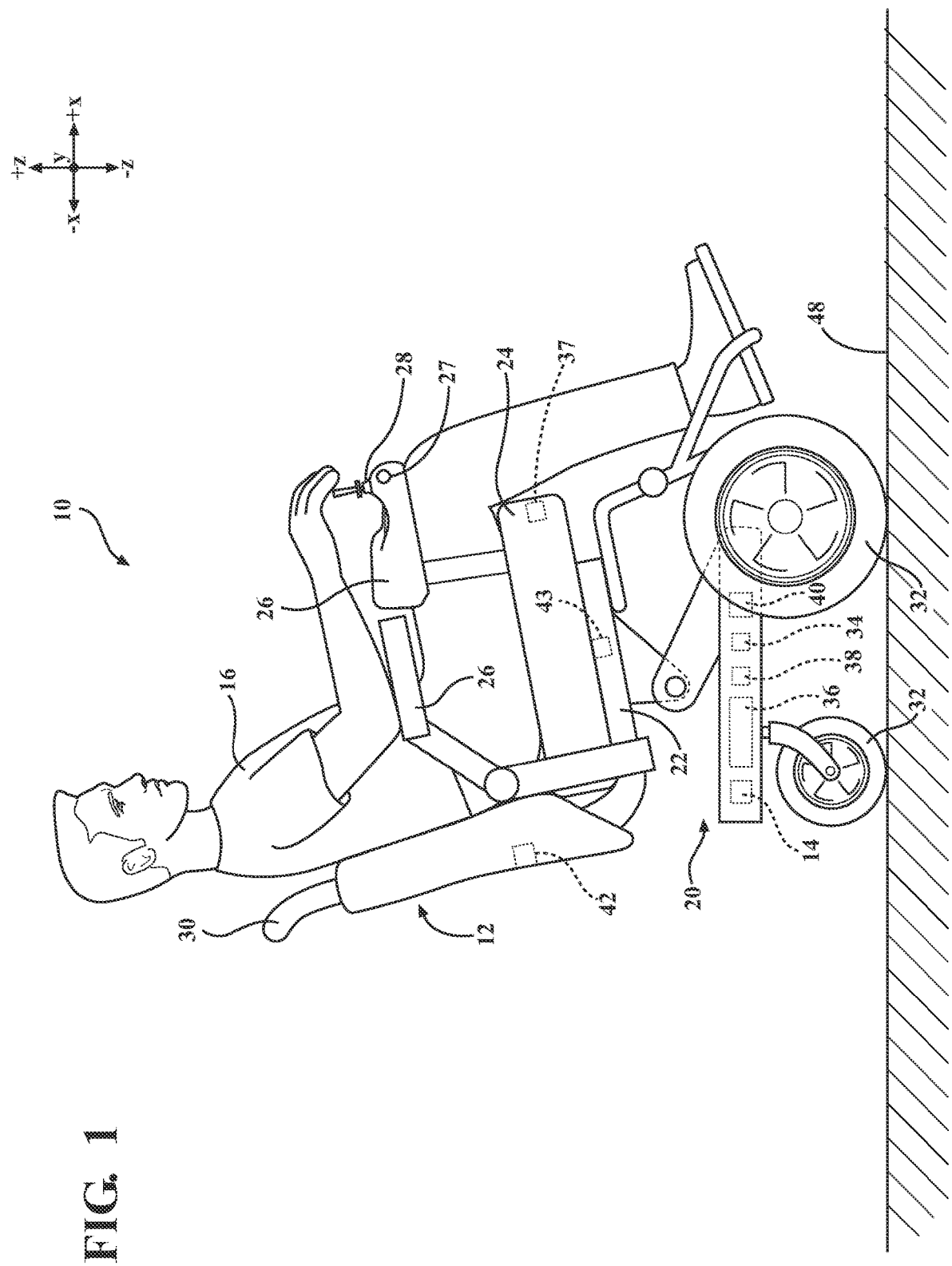
FIG. 1 schematically depicts an example wheelchair system in a companion follow mode according to one or more embodiments described and illustrated herein.

As used herein, the term "system longitudinal direction" refers to the forward-rearward direction of the system (i.e., in a +/−X direction of the coordinate axes depicted in FIG. 1). The term "system lateral direction" refers to the cross-direction (i.e., along the Y axis of the coordinate axes depicted in FIG. 1), and is transverse to the longitudinal direction. The term "system vertical direction" refers to the upward-downward direction of the system (i.e., in the +/−Z direction of the coordinate axes depicted in FIG. 1). As used herein, "upper" or "uppermost" is defined as generally being towards the positive Z direction of the coordinate axes shown in the drawings. "Lower" or "lowermost" is defined as generally being towards the negative Z direction of the coordinate axes shown in the drawings.

Figure 2:
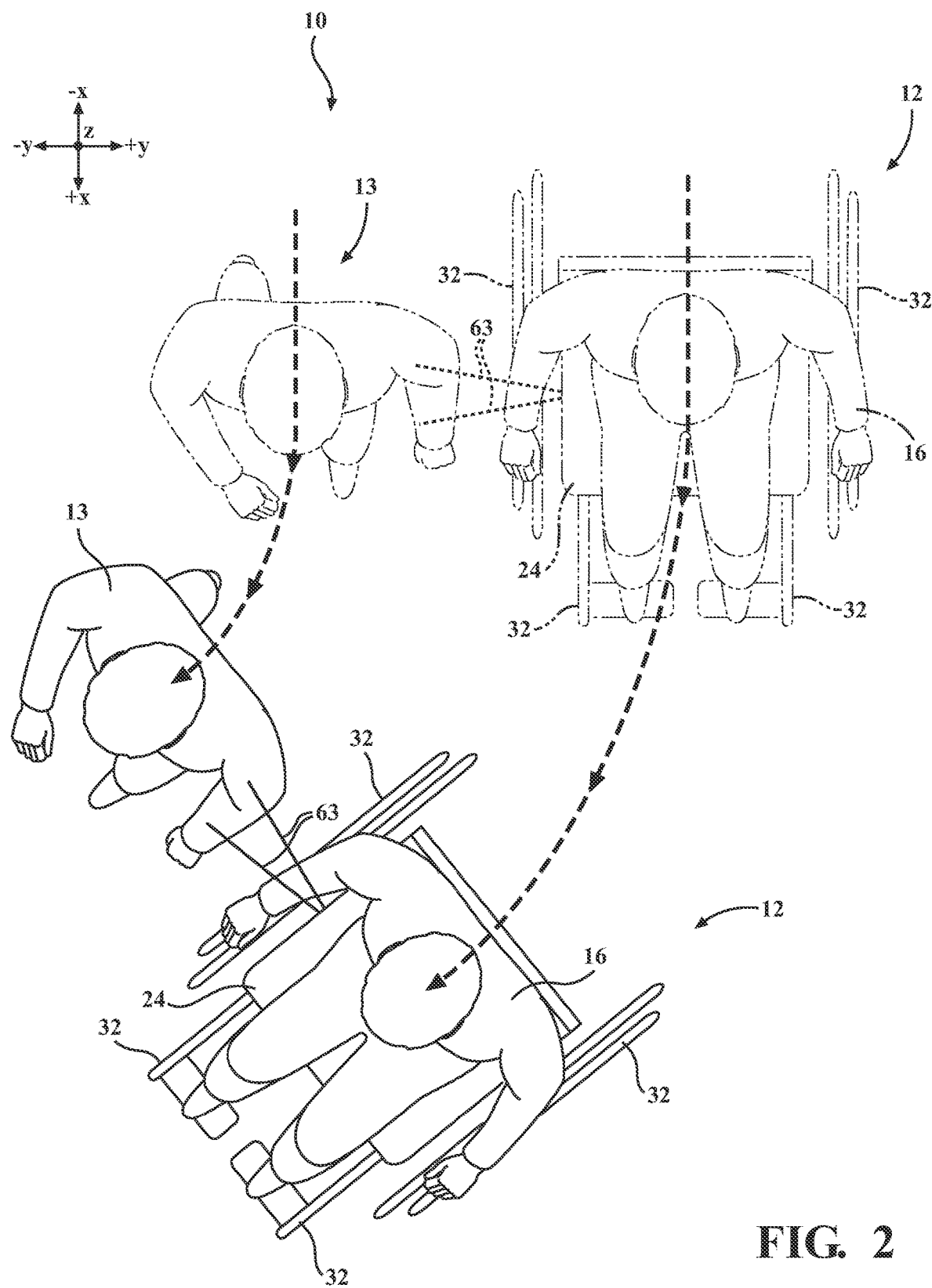
FIG. 2 schematically depicts a wheelchair from the wheelchair system of FIG. 1 according to one or more embodiments described and illustrated herein.

Referring initially to FIGS. 1-2, a schematic depiction of a wheelchair system, generally designated 10, is provided. The system 10 generally includes a wheelchair 12 and a companion 13. In some embodiments, the companion is a human that moves along a side of the wheelchair 12. The wheelchair includes a control unit 14. The wheelchair 12 is a powered wheelchair that includes motorized components that allow a user 16 to electronically control movement of the wheelchair. Accordingly, various components of the wheelchair 12 should be understood and are not described in further detail herein. In some embodiments, the wheelchair 12 may include a power base portion 20, a frame 22, and a seat portion 24 supported by the frame 22, which in turn is supported by the power base portion 20. Thus, the frame 22 is generally positioned below the seat portion 24 in a system vertical direction (i.e., positioned in the −Z direction of the coordinate axes of FIG. 1 relative to the seat portion 24) and the power base portion 20 is generally positioned below the frame 22 in a system vertical direction (i.e., positioned in the −Z direction of the coordinate axes of FIG. 1 relative to the frame 22).

Still referring to FIG. 1, in some embodiments, the power base portion 20 may raise, tilt, or otherwise move the frame 22 and thus the seat portion 24. The frame 22 and the seat portion 24 are generally configured to support the user 16 when the user 16 is seated in the wheelchair 12. In some embodiments, the seat portion 24 may include a pair of armrests 26 to which a controller 28 may be coupled. As described herein, a controller 28 may provide the user 16 with an ability to control movement of the wheelchair 12. In some embodiments, the controller 28 may be a joystick-type controller where the user 16 directs the joystick in accordance with a desired direction and/or speed of travel. Accordingly, the controller 28 may be communicatively coupled to the power base portion 20, including various components thereof, to transmit signals to the power base portion 20 to cause the wheelchair 12 to respond according to the inputs received by the controller 28. It should be understood that the joystick configuration is merely illustrative, and in some embodiments, the controller 28 may utilize other designs, such as buttons, switches, voice controls, breath controls, and/or the like to receive inputs from a user 16 via a user interface and the like.

In some embodiments, the seat portion 24 may include one or more handles 30 integrated therein or coupled thereto. The one or more handles 30 may provide an area for a user (e.g., a caregiver) to grip the wheelchair 12. For example, at least one of the one or more handles 30 may be located on a back portion of the seat portion 24 such that a user may grasp the one or more handles 30 when moving behind the wheelchair 12.

The power base portion 20 may include, but is not limited to, one or more wheels 32, an actuator 34, a battery 36, and the control unit 14. The control unit 14 may be an electronic control unit and may generally be a control device that controls the wheelchair 12 and/or one or more components thereof. As such, the control unit 14 may be communicatively coupled to the various components of the wheelchair 12 such that one or more control signals can be transmitted from the control unit 14 to the various components such as the actuator 34, as described in greater detail herein. The actuator 34, which may be configured as one or more motors, is coupled to the wheels 32 to drive movement of the wheels 32. The battery 36 may generally provide electrical power to the various components of the wheelchair 12, such as the actuator 34. Further, in some embodiments, the power base portion 20 may include a position sensor 40, such as a global position system (GPS) device that is configured to transmit the location of the wheelchair 12 and/or receive the position of other objects relative to the wheelchair 12. Other components of the power base portion 20 should generally be understood and are not described in further detail herein.

The one or more wheels 32 may be configured as any type of wheel. As a non-limiting example, the one or more wheels 32 may be omni-directional wheels, which may enable a user to easily move the wheelchair 12 in any direction when it is in the fine manual motion control described below.

The control unit 14 may generally be a standalone control device that contains one or more components for controlling movement of the wheelchair 12. It should be appreciated that while the control unit is shown in FIGS. 1-3C as part of the power base portion 20 of the wheelchair 12, this is a non-limiting example. That is, the control unit 14 may be a device that is separate from the power base portion 20, such as a device that is coupled to or integrated with the pair of armrests 26, the seat portion 24, and/or the like. In some embodiments, the control unit 14 may be separate from the wheelchair 12 altogether, such as, for example, a user carried computing device, the user's mobile device, and/or the like.

Referring to FIGS. 1-3A, various illustrative components of the control unit 14 are schematically depicted. The control unit 14 may be communicatively coupled to a network 73. The network 73 may include a wide area network (WAN), such as the Internet, a local area network (LAN), a mobile communications network, a public service telephone network (PSTN), a personal area network (PAN), a metropolitan area network (MAN), a virtual private network (VPN), and/or another network that can electronically connect to the control unit 14. The network 73 may communicatively couple the control unit 14 to a personal electronic device, such as, a mobile phone, a tablet, and the like, as discussed in greater detail herein.

In various embodiments, the control unit 14 includes a network interface 66, a processor device 60, a data storage device 70, and a memory component 68. The processor device 60, such as a computer processing unit (CPU), may be the central processing unit of the control unit 14, performing calculations and logic operations to execute a program. The processor device 60, alone or in conjunction with the other components, is an illustrative processing device, computing device, processor, or combination thereof. The processor device 60 may include any processing component configured to receive and execute instructions (such as from the memory component 68). A local interface 64, such as a bus or the like, may interconnect the various components.

It should be understood that the local interface 64 may be formed from any medium that is capable of transmitting a signal such as, for example, conductive wires, conductive traces, optical waveguides, or the like. In some embodiments, the local interface 64 may facilitate the transmission of wireless signals, such as Wi-Fi, Bluetooth, Near Field Communication (NFC) and the like. Moreover, the local interface 64 may be formed from a combination of mediums capable of transmitting signals. In one embodiment, the local interface 64 comprises a combination of conductive traces, conductive wires, connectors, and buses that cooperate to permit the transmission of electrical data signals to components such as processors, memories, sensors, input devices, output devices, and communication devices.

In some embodiments, the memory component 68 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. Further, the memory component 68 may be a non-transitory, processor-readable memory. The memory component 68 may include one or more programming instructions thereon that, when executed by the processor device 60, cause the processor device 60 to complete various processes, such as one or more of the processes described herein with respect to FIGS. 4-5.

Figure 3A:
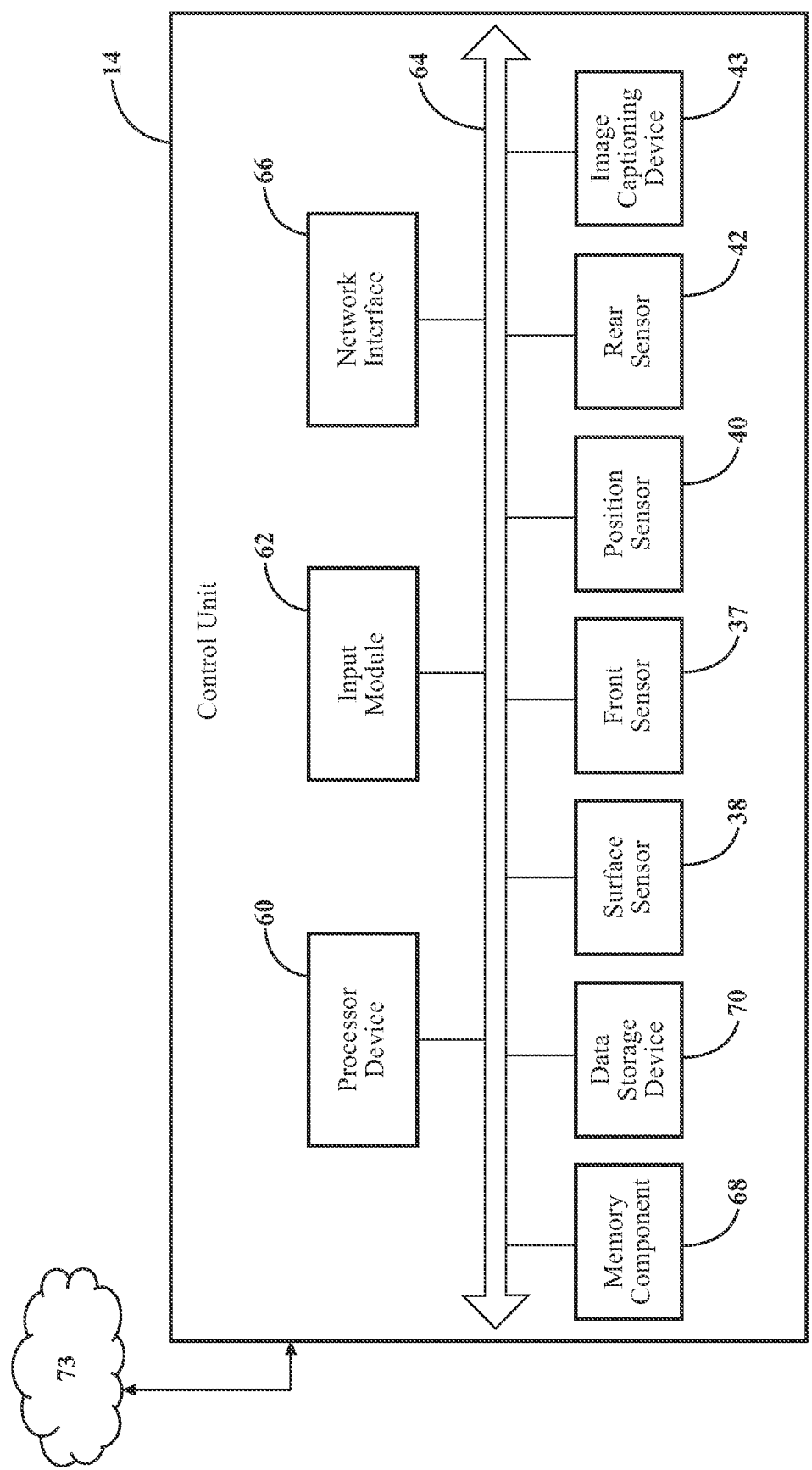
FIG. 3A schematically depicts components of an example control unit of an example wheelchair system according to one or more embodiments described and illustrated herein.
Figure 3B:
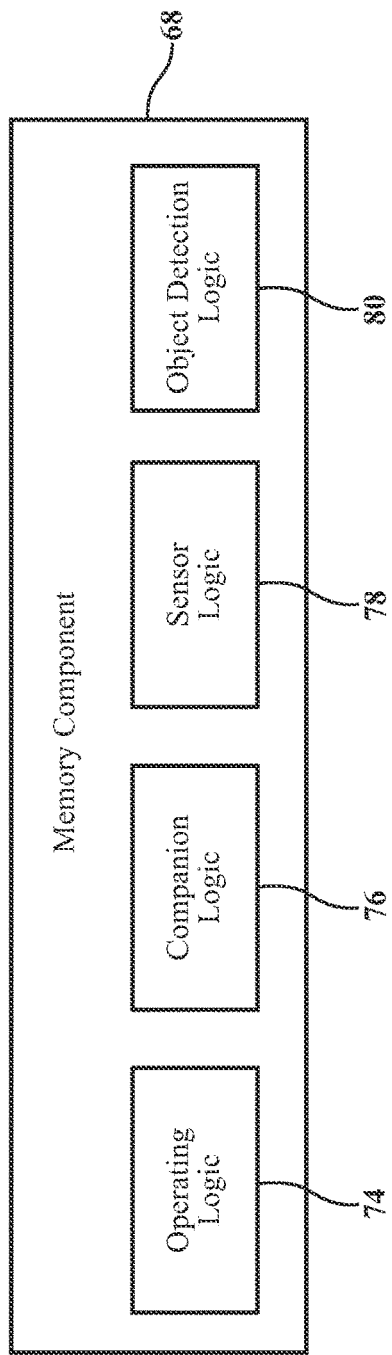
FIG. 3B schematically depicts logic modules of an example memory component of the example wheelchair system of FIG. 3A according to one or more embodiments described and illustrated herein.

Referring to FIG. 3B, the programming instructions stored on the memory component 68 may be embodied as one or more software logic modules, where each logic module provides programming instructions for completing one or more functions, such as the functions described in greater detail below with respect to FIGS. 4-5. For instance, a wheelchair operating logic module 74 may include one or more different pieces of logic, each of which may be embodied as a computer program, firmware, and/or software/hardware, which may be executable by the processor device 60 to cause the wheelchair 12 to move and/or orientate itself with respect to commands provided by the user 16.

Further, the wheelchair operating logic module 74 may include one or more different pieces of logic, each of which may be embodied as a computer program, firmware, and/or software/hardware, which may be executable by the processor device 60 to cause the wheelchair 12 to move and/or orientate itself with respect to autonomous commands such as when the wheelchair 12 is in the companion control mode. As such, in the companion control mode, the wheelchair may autonomously follow or mimic movements of the companion 13, such that the wheelchair 12 moves without the need or input of the user 16. That is, the actuator 34 may autonomously control movement of the one or more wheels 32 of the wheelchair to drive the wheelchair 12. It should be appreciated that in the companion control mode, the wheelchair operating logic module 74 may predict movements by the companion 13 based on a history or other indicators, such as objects surrounding the wheelchair 12, such that the wheelchair 12 has a slow motion or "less jerky" motion to weaving and sudden turns by the companion. On the other hand, the system may increase speeds in turns and other maneuvers such that the user 16 has a pleasant experience.

A companion logic module 76 may include one or more pieces of logic, each of which may be embodied as a computer program, firmware, and/or software/hardware, which may be executable by the processor device 60 to determine the companion, determine the movements of the companion, and convey those movements to other systems of the wheelchair, such as the wheelchair operating logic module 74. As such, the companion logic module 76 may assist in identifying the companion and assist in directing the wheelchair to mimic or follow the companion movements when the wheelchair is in a companion control mode, as discussed in greater detail herein.

In other embodiments, the companion logic module 76 may include one or more pieces of logic, each of which may be embodied as a computer program, firmware, and/or software/hardware, which may be executable by the processor device 60 to, based on a plurality of user preferences, determine the companion, how long to follow the companion, and the like. For example, the plurality of user preferences may include manually inputting a type of clothing or a color that the companion is wearing, uploading a picture or other facial recognition features, cadence information and the like. In some embodiments, the user preferences may be uploaded via a mobile phone, tablet, other personal electronic device using the internet, Bluetooth®, and the like. In other embodiments, the user preferences may be uploaded directly into the control unit 14 of the wheelchair 12. Any object recognition algorithm may be used to determine whether the object in range of the wheelchair 12 fits the criteria to be the companion 13, and, if so, the system initiates the companion control mode, as discussed in greater detail herein.

A sensor logic module 78 may include one or more pieces of logic, each of which may be embodied as a computer program, firmware, and/or software/hardware, which may be executable by the processor device 60 to receive a process signals and/or data from one or more sensors, such as the sensors illustrated in FIGS. 2 and 3A.

An object detection logic 80 may include one or more pieces of logic, each of which may be embodied as a computer program, firmware, and/or software/hardware, which may be executable by the processor device 60 to receive sensor data (e.g., image data from a camera) to detect objects surrounding the wheelchair 12. As described in more detail below, the object detection logic 80 may use sensor data to detect undesirable objects in the path of the wheelchair 12 when the wheelchair is in the companion control mode that may cause an undesirable condition should the wheelchair 12 stay in the companion control mode. As such, the object detection logic 80 may move the wheelchair from the companion control mode to a standard mode, where the user has full control of the wheelchair using, for example, the controller, to enable manual motion control mode.

As used herein, "companion control mode" means that the wheelchair is in an autonomous mode (i.e., moves without the user 16 manually controlling or directing the wheelchair) such that the wheelchair follows or mimics the companion 13. The "standard mode" means that the wheelchair is controlled and operated by the user 16, such as with the controller 28. An "undesirable object" means an object that poses an undesirable result for a user seated in a wheelchair 12. Non-limiting examples of undesirable objects include potholes, a vehicle, a sign, a curb, another person, an animal, and the like.

Referring once again to FIG. 3A, an input module 62 is provided to enable the user 16 to input controls into the control unit 14 and thus the wheelchair 12. The input module 62 may be communicatively coupled to the controller 28 and/or another input device (e.g., switch 27), as described in more detail below. The input module 62 may communicate input signals to the processor device 60, for example, such that the user 16 may use the controller 28 to move the wheelchair via the actuator 34. Thus, it should be appreciated that the user controls, as discussed in greater detail herein, may be transmitted to the control unit 14 through the input module 62. Further, it should be appreciated that the user 16 may select the user controls by a button, such as a push button, a switch, such as a toggle switch, and the like on the wheelchair 12 including from on the pair of armrests 26 or from a program selection initiated at an external device such as a portable computing device, smartphone, or the like by way of the network interface 66 described below.

The network interface 66 of the control unit 14 may include any wired or wireless networking hardware, such as a modem, LAN port, wireless fidelity (Wi-Fi) card, WiMax card, mobile communications hardware, and/or other hardware for communicating with other networks and/or devices. Therefore, the communication between the control unit 14, the wheelchair 12, and/or other external devices may be provided through the network interface 66.

The data storage device 70, which may generally be a storage medium, may contain one or more data repositories for storing data that is received and/or generated, and may be any physical storage medium, including, but not limited to, a hard disk drive (HDD), memory, removable storage, and/or the like. While the data storage device 70 is depicted as a local device, it should be understood that the data storage device 70 may be a remote storage device, such as, for example, a server computing device or the like. Illustrative data that may be contained within the data storage device 70 is described below with respect to FIG. 3C and includes, but is not limited to, companion data 82, rear sensor data 84, front sensor data 86, surface data 88, position data 90, and image data 92.

Referring again to FIGS. 1-3A, the wheelchair 12 may include a plurality of sensors that provide sensor data to effectuate the functionalities described herein. The plurality of sensors include, but are not limited to, a surface sensor 38, a front sensor 37, a position sensor 40, a rear sensor 42, and an image capturing device 43 or sensor. It should be understood that more or fewer sensors may be provided. Further, it should be appreciated that the surface sensor 38, a front sensor 37, a position sensor 40, a rear sensor 42, and an image capturing device 43, if equipped, may be communicatively coupled to the local interface 64 and coupled to the processor device 60 via the local interface 64.

The surface sensor 38 is operable to produce surface data 88 that is indicative of the type of surface 48 the wheelchair 12 is operating on. Different surfaces have different coefficients of friction with respect to the one or more wheels 32 and thus create different wheel torque on the one or more wheels 32. Non-limiting surface include tile floors, laminate floors, wood floors, decking, concrete surfaces, Earth surfaces, gravel surfaces, and the like. The type of surface may be used to determine how to follow the companion in the companion control mode. As a non-limiting example, the data storage device 70 may store example coefficients of friction for different surface types. The surface sensor 38 may be, for example, an image sensor that creates image data of the surface 48. As a non-limiting example, the surface sensor 38 may be positioned under the seat portion 24 and have a field of view of the surface 48. This image data may be used by control unit 14 to determine the type of surface. Any object recognition algorithm may be used to determine the type of surface.

Some embodiments include a front sensor 37, if provided, may be located at a front of the wheelchair 12 (e.g., on the frame, armrest, and the like, and aimed towards the front) and may produce data indicative of objects in front of the wheelchair 12. In a non-limiting example, the front sensor 37 is an image sensor that produces image data that can be processed using an object detection algorithm to detect objects, such as undesirable objects that lead to an undesirable condition, as described in more detail below with respect to the flowchart 400 of FIG. 4. It should be understood that embodiments may also not include the front sensor 37. In other embodiments, the front sensor 37 is a sensor, such as a laser-based sensor, a proximity sensor, a level detection sensor, a pressure sensor, any combination thereof, and/or any other type of sensor that one skilled in the art may appreciate.

The rear sensor 42, if provided, may be located at a rear of the wheelchair 12 (e.g., on the seatback) and may produce data indicative of objects behind the wheelchair 12. In a non-limiting example, the rear sensor 42 is an image sensor that produces image data that can be processed using an object detection algorithm to detect objects, such as undesirable objects that lead to an undesirable condition, as described in more detail below with respect to the flowchart 400 of FIG. 4. It should be understood that embodiments may also not include a rear sensor 42. In other embodiments, the rear sensor 42 is a sensor, such as a laser-based sensor, a proximity sensor, a level detection sensor, a pressure sensor, any combination thereof, and/or any other type of sensor that one skilled in the art may appreciate.

The wheelchair may also include a position sensor 40, which may be configured as a GPS sensor, for example, The position sensor 40 provides data regarding the location of the wheelchair 12 in the environment. The position of the wheelchair 12 may be useful in determining objects surrounding the wheelchair 12. The position sensor 40 may also include other sensors, such as a wireless Bluetooth® sensor operable to communicate with wireless Bluetooth® beacons to triangulate the position of the wheelchair 12, and determine the location of the wheelchair 12 with respect to objects.

Still referring to FIGS. 1-3A, the image capturing device 43, if equipped, may be any imaging device, sensor, or detector that is suitable for obtaining images. As used herein, the term "images" or "image" refers to video images (i.e., a sequence of consecutive images), still images (including still images isolated from video images), and/or image data. Any suitable commercially available image capturing device 43 may be used without departing from the scope of the present disclosure. In some embodiments, the image capturing device 43 may be coupled to one or more other components that provide additional functionality for imaging, such as, for example, one or more sensors.

The image capturing device 43 may include or may be coupled to a lens (not shown). The lens is not limited by this disclosure and may generally be any optical component that is configured to focus the light entering the image capturing device 43 such that an image can be properly obtained. In some embodiments, the lens may be a fixed lens that is not adjustable. In other embodiments, the lens may be adjustable, either manually or automatically by the processor device 60, to zoom in on an object (i.e., the companion 13), zoom out on an object (i.e., the companion 13), and/or adjust the focus of the light entering the image capturing device 43.

It should be appreciated that either side or both sides of the wheelchair 12 may equipped with the image capturing device 43. Further, in some embodiments, either side or both sides of the wheelchair 12 may equipped with a plurality of other sensors, such as sensor that determines a depth of an object, such as the companion 13 from a fixed position, such as a distance from one or more wheels 32 or frame 22 of the wheelchair 12. Other sensors may be proximately sensors, pressure sensors such as whiskers, toggle switches and the like.

Figure 3C:
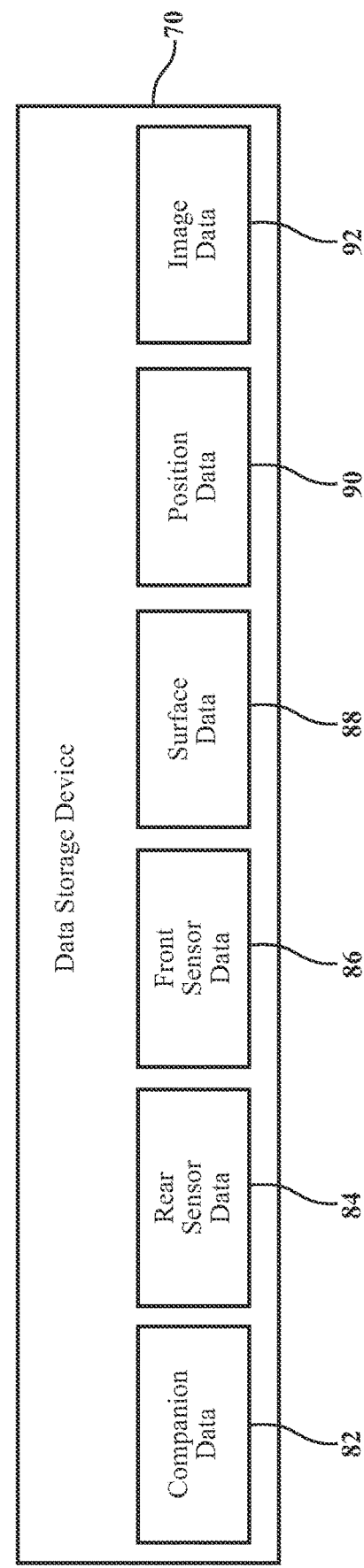
FIG. 3C schematically depicts example data stored within an example data storage device of the example wheelchair system of FIG. 3A according to one or more embodiments described and illustrated herein.

Referring now to FIG. 3C, the data storage device 70 may store data to perform the functionalities described herein, such as determining and following the companion in the companion control mode and/or exiting the companion control mode when an undesirable object is in the path of movement of the wheelchair 12. Embodiments may include some, all, or more than the data depicted in FIG. 3C.

Companion data 82 may be data determined from the image capturing device 43, input user preferences, and the like. The companion data 82 may include generated profile data about the companion such as a type or recognized color of clothing, facial recognition or facial expressions, cadence of a walk and/or a talk of the companion 13, and the like. Historical companion data 82 may be stored in the data storage device, which may be used by the control unit 14 to learn specific profile characteristics on the companion 13 for future determination, for example.

The rear sensor data 84 produced by the rear sensor 42, if provided, may also be stored in the data storage device 70. As stated above and described in more detail below, the rear sensor data 84 may be used to detect undesirable objects and/or conditions, and remove the wheelchair 12 from the companion control mode such that the wheelchair 12 is operated in a standard mode.

The front sensor data 86 produced by the front sensor 37, if provided, may also be stored in the data storage device 70. As stated above and described in more detail below, the front sensor data 86 may be used to detect undesirable objects and/or conditions, and remove the wheelchair 12 from the companion control mode such that the wheelchair 12 is operated in a standard mode.

Image data 92 produced by the image capturing device 43, if provided, may also be stored in the data storage device 70. As stated above and described in more detail below, the image data 92 may include a plurality of images of the companion 13 during the companion control mode, that the processor device 60 uses to determine movement of the companion 13 and directs the actuator 34 of the wheelchair 12 to mimic the movement.

Other data in the form of position data 90 produced by the position sensor 40 and surface data 88 (e.g., image data of the surface) produced by the surface sensor 38, if such sensors are provided. Such data may be used to determine and follow the companion 13 in the companion control mode and/or exiting the companion control mode when an undesirable object is in the path of movement of the wheelchair 12, as described in more detail below with respect to FIGS. 4-5.

Figure 4:
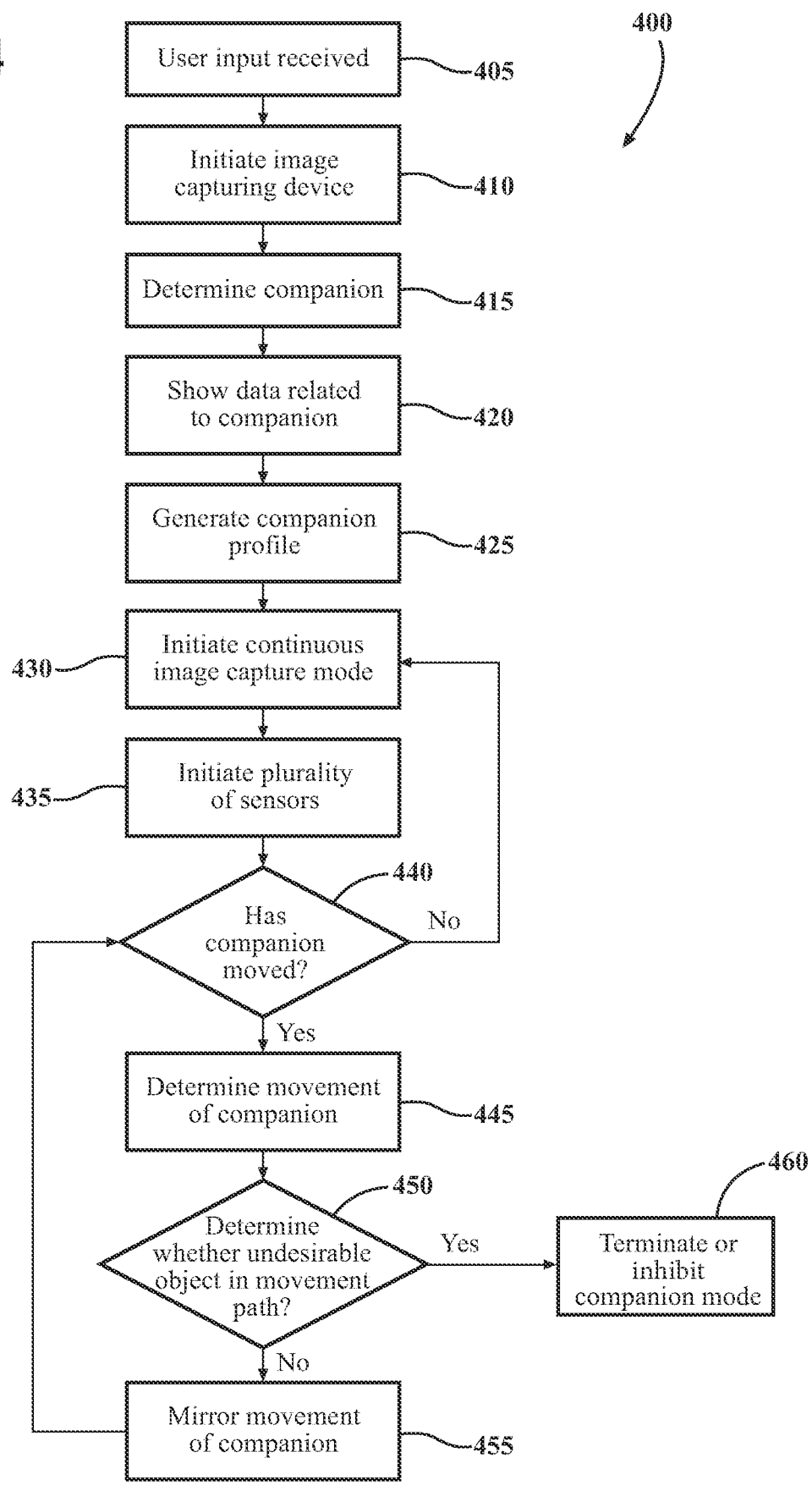
FIG. 4 graphically depicts a flowchart of an example method of a companion control mode according to one or more embodiments described and illustrated herein.

Referring now to FIG. 4, an example method of the companion control mode is illustrated by a flowchart 400. When the user 16 wishes to enable a companion control mode, the user 16 may use an input device (e.g., a switch 27, the controller 28, or any other input device) at block 405 to enter the companion control mode such that the wheelchair 12 autonomously follows the companion 13 such that the user 16 and the companion 13 may be next to one another and canyon a conservation. It should be understood that the user 16 may enter the companion control mode at any time, and he or she does not need to first wait for a companion to be next to the wheelchair 12.

In some embodiments, the wheelchair 12 may automatically enter and exit the companion control mode without a user input. In such embodiments, user preferences may command the companion control mode to initiate using the companion data 82 and the image data 92 produced by the image capturing device 43 and, once detected and the user has stopped motorized movement of the wheelchair 12, the companion control mode is enabled. For example, any object recognition algorithm may be used to detect and classify individuals once they are identified as companions and may recognize these companion again. For example, users may converse with certain individuals, or companions, around the same time every day and the system may recognize that companion, based on clothing, facial recognition, cadence, and the like. In some embodiments, the position sensor 40 is used in lieu of, or in addition to, the image capturing device 43 to detect when the companion has approached the user.

Once the user input is received, the image capturing device 43 is initiated, at block 410. It should be appreciated that in embodiments, without the image capturing device 43, a plurality of sensors is activated (i.e., proximately sensors, depth sensors and the like). Further, in embodiments, when the image capturing device 43 is initiated, the plurality of other sensors is activated (i.e., proximately sensors, depth sensors and the like). At block 415, the system 10 determines the companion and the system may request confirmation of the companion by showing data to the user 16 to confirm, at block 420. The data may be shown to the user via a mobile phone, tablet, or a user interface of the wheelchair 12.

At block 425, the system 10 generates a companion profile that includes specific data and characteristics about the companion 13, such as the type and/or color of clothing, facial recognition, and cadence of the companion. The cadence may be either a walking cadence and/or talking cadence that the system 10 is able to recognize using a plurality of algorithms to establish a particular profile for every companion 13. Once the companion profile is generated, the system 10 initiates the continuous image capturing mode, at block 430, and initiates the plurality of sensors (e.g., the surface sensor 38, the front sensor 37, the rear sensor 42, and the position sensor 40), at block 435. The system determines whether the companion 13 has moved, at block 440. If the companion has not moved, then the system 10 waits and loops between the continuous image capturing mode, at block 430, and initiating the plurality of sensors (e.g., the surface sensor 38, the front sensor 37, the rear sensor 42, and the position sensor 40), at block 435, until the companion is determined to move, at block 440. Once it is determined that the companion has moved, at block 440, the system 10 determines the movement of the companion, at block 445.

In the example of FIG. 2, the user 16 and the wheelchair 12 have identified the companion 13 via the image capturing device 43 illustrated by a companion determination 63. The image capturing device 43 captures images of the companion and the control unit 14 identifies specific identifying features of the companion 13 to recognize the companion, as discussed in greater detail herein. As illustrated, the companion 13 is positioned next to the wheelchair 12 and the user 16 such that the companion 13 and the user 16 may have a conversation face to face. Further, as illustrated, the companion 13 is illustrated with an example movement of turning away from the wheelchair 12. The system 10 directs or controls the wheelchair 12, by actuating the actuator 34, to drive the one or more wheels 32 of the wheelchair 12 to follow the companion in the example movement, and turn or move along the same arc as the companion 13. It should be appreciated that the image data 92, companion data 82 and/or position data 90 is used to recognize that the companion 13 has moved with respect to the wheelchair 12 and the system 10 autonomously controls the wheelchair 12 to follow the companion 13. It should be understood that the example movements are merely illustrative, and that the companion 13 may move in any direction including into the wheelchair 12, behind the wheelchair 12, and/or in front of the wheelchair 12. In any of these example movements, the system 10 may determine the movement of the companion 13 and direct the actuator 34 to move the wheels 32 of the wheelchair 12 to follow or mimic the movements of the companion 13. In some embodiments, the wheelchair 12 may notify the user 16 that the wheelchair 12 has entered the companion control mode.

Once the movement of the companion is detected, the system determines whether there is an undesirable object or condition in the path of movement, at block 450. If there is not an undesirable object within the path of movement, the systems controls the wheelchair 12 to mimic the movement of the companion 13, at block 455. On the other hand, if there is an undesirable object or condition determined in the path of the wheelchair 12, the system 10 terminates the companion control mode, at block 460, placing the wheelchair 12 into standard mode where the user 16 controls any movement. That is, the system 10 may inhibit the autonomous control of the actuator 34 to prohibit the autonomously driving the one or more wheels 32 of the wheelchair 12 to follow the movements of the companion 13 by the actuator 34. For example, one or more sensors may be used to detect an undesirable object or an undesirable condition. Non-limiting examples of the sensors used to detect the undesirable object or undesirable condition include the rear sensor 42, the front sensor 37, the surface sensor 38, and the image sensor 43 shown in FIG. 1. Image data from the one or more sensors may be used to detect undesirable objects. The phrase "undesirable object" as used herein means any object that the user may inadvertently bump into while in the companion control mode. Non-limiting examples of undesirable objects include a pet that happens to be walking behind the wheelchair 12, an object deemed to be easily tipped over, stairs leading downward, or an object that may cause damage to the wheelchair 12 such as potholes, curbs, parked vehicles, moving vehicles, bicycles, pedestrians, and the like. Embodiments are not limited by the type of undesirable object.

Figure 5:
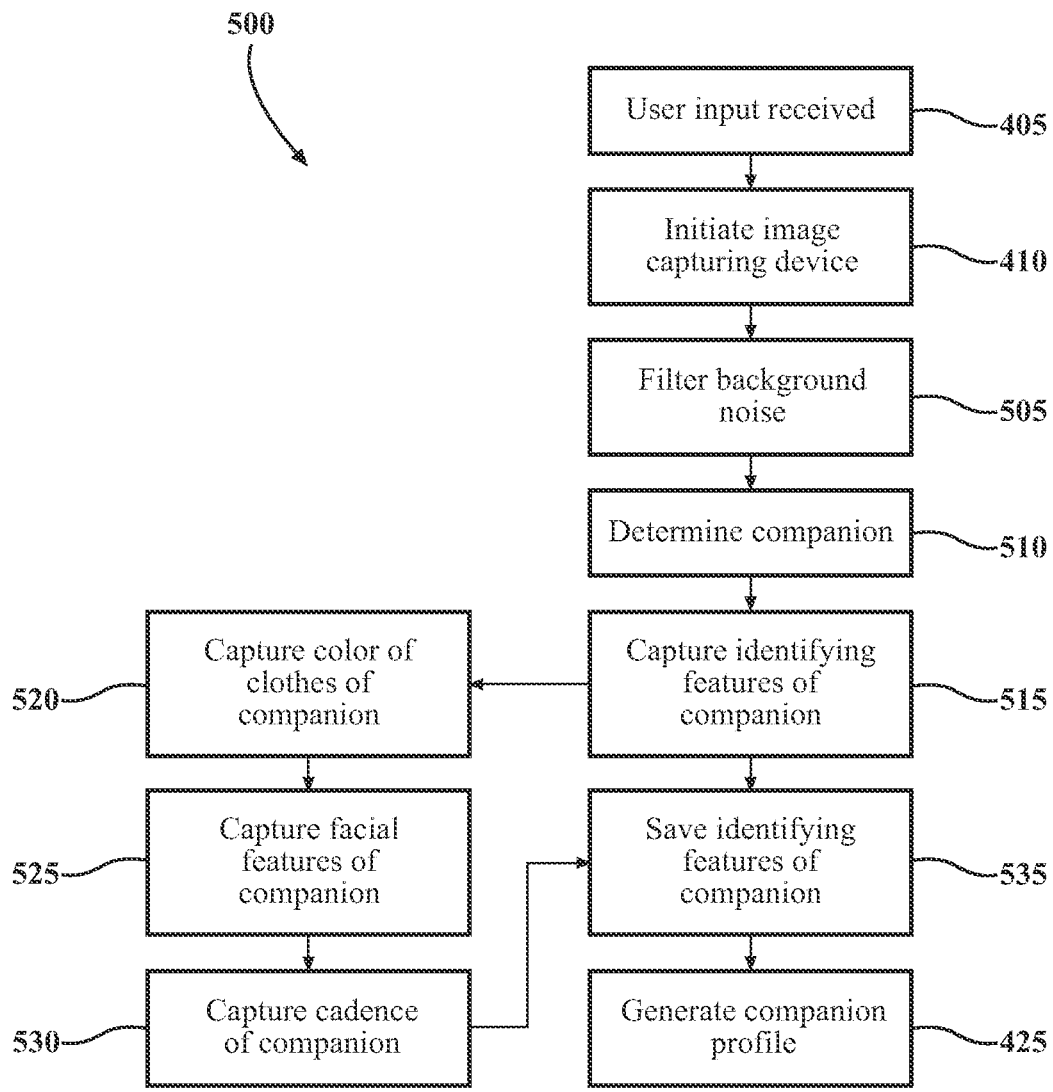
FIG. 5 graphically depicts a flowchart of an example method of generating a companion profile according to one or more embodiments described and illustrated herein.

Referring now to FIG. 5, an example method of generating the companion profile is illustrated by a flowchart 500.

When the user 16 wishes to enable a companion control mode, the user 16 may use an input device (e.g., a switch 27, the controller 28, or any other input device) at block 405 to enter the companion control mode such that the wheelchair 12 autonomously follows the companion 13 such that the user 16 and the companion 13 may be next to one another and carryon a conservation. It should be understood that the user 16 may enter the companion control mode at any time, and he or she does not need to first wait for a companion to be next to the wheelchair 12.

Once the user input is received, the image capturing device 43 is initiated, at block 410. It should be appreciated that in embodiments, without the image capturing device 43, a plurality of sensors is activated (i.e., proximately sensors, depth sensors and the like). Further, in embodiments, when the image capturing device 43 is initiated, the plurality of other sensors is activated (i.e., proximately sensors, depth sensors and the like). At block 505, the system 10 filters the captured images to eliminate or filter background noise. It should be appreciated that the system 10 filters the background noise to hone in or key onto the companion 13 within an image. With the background noise filtered, the companion is determined from the image data at block 510, and identifying features of the companion 13 is captured and saved at block 515. It should be appreciated that this data may be stored as companion data 82 and/or image data 92. For example, specific identifying features of the companion 13 that may be captured and saved to ensure that the system 10 follows the proper companion 13 is the color of clothes of the companion, at block 520, facial features of the companion 13, at block 525, and cadence of the companion 13, at block 530.

Once the color of clothes of the companion is captured, at block 520, facial features of the companion 13 is captured, at block 525, and cadence of the companion 13 is captured, at block 530, the system 10 stores the identifying features of the companion 13, such as companion data 82 and/or image data 92, at block 535. At block 425, the system 10 generates a companion profile that includes specific data and characteristics about the companion 13, such as the type and/or color of clothing, facial recognition, and cadence of the companion.

It should now be understood that the systems and methods described herein provide a wheelchair capable of entering a companion control mode such that a user of a wheelchair may be able to have a conservation with a companion moving along side of the wheelchair and the wheelchair follows or mimics the movements of the companion in an autonomous control without the need for the user to control the wheelchair. Embodiments further determine when an undesirable object or condition is present to inhibit the autonomous control of the wheelchair.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A wheelchair system comprising:
   a wheelchair operable to detect a companion, the wheelchair comprising:
      a plurality of sensors,
      one or more wheels,
      at least one actuator coupled to the one or more wheels,
      a processing device, and a processor-readable storage medium in communication with the processing device and the plurality of sensors, the storage medium storing one or more programming instructions that, when executed, cause the processing device to:
  generate a companion profile based on a plurality of identifying features of a determined companion,
  determine a movement of the companion,
  actuate the at least one actuator to drive the one or more wheels to follow the movement of the companion,
  wherein the actuation of the at least one actuator to drive the one or more wheels to follow the movement of the companion is an autonomous control,
  detect an undesirable object in a path of movement of the wheelchair, and
  inhibit the autonomous control of the at least one actuator.

2. The wheelchair system of claim 1, wherein the companion is positioned to move along a side of the wheelchair.

3. The wheelchair system of claim 1, wherein the companion profile is generated when the one or more programming instructions further cause the processing device to:
  initiate an image capturing device to capture an image of the companion,
  filter a background from a plurality of background noise, and
  determine the companion.

4. The wheelchair system of claim 3, wherein the plurality of identifying features of the determined companion to generate the companion profile is based on a recognized color of clothing of the companion captured by the image capturing device.

5. The wheelchair system of claim 3, wherein the plurality of identifying features of the determined companion to generate the companion profile is based on a facial expression of the companion captured by the image capturing device.

6. The wheelchair system of claim 3, wherein the plurality of identifying features of the determined companion to generate the companion profile is based on a cadence of the companion captured by the image capturing device.

7. A wheelchair system comprising:
  a wheelchair operable to detect a companion, the wheelchair comprising:
    a frame,
    one or more wheels coupled to the frame,
    at least one actuator coupled to the one or more wheels,
    a plurality of sensors, and
    a control unit,
      wherein the control unit controls the wheelchair between a standard mode and a companion control mode such that in the companion control mode, the control unit actuates the at least one actuator to drive the one or more wheels to follow a movement of the companion,
      wherein the actuation of the at least one actuator to drive the one or more wheels to follow the movement of the companion is an autonomous control,
      the control unit further configured to detect an undesirable object in a path of movement of the wheelchair and inhibit the autonomous control of the at least one actuator.

8. The wheelchair system of claim 7, further comprising:
  at least one image capturing device communicatively coupled to the control unit.

9. The wheelchair system of claim 8, wherein the control unit is further configured to:
  activate the at least one image capturing device,
  determine the companion,
  generate a companion profile based on the determined companion, and
  determine the movement of the companion.

10. The wheelchair system of claim 9, wherein the control unit is further configured to:
  filter a background from a plurality of background noise, and
  determine the companion,
  wherein the companion profile is generated from a plurality of identifying features of the determined companion.

11. The wheelchair system of claim 10, wherein at least one of the plurality of identifying features of the determined companion to generate the companion profile is based on a recognized color of clothing of the companion captured by the at least one image capturing device.

12. The wheelchair system of claim 10, wherein at least one of the plurality of identifying features of the determined companion to generate the companion profile is based on a facial expression of the companion captured by the at least one image capturing device.

13. The wheelchair system of claim 10, wherein at least one of the plurality of identifying features of the determined companion to generate the companion profile is based on a cadence of the companion captured by the at least one image capturing device.

14. The wheelchair system of claim 7, wherein the companion is positioned to move along a side of the wheelchair.

15. A method of operating a wheelchair, the method comprising:
  receiving, by a control unit, an input from a user, the input corresponding to a request for a companion control mode;
  determining, by the control unit, a companion;
  determining, by the control unit, a movement of the companion;
  actuating, by the control unit, at least one actuator to drive one or more wheels of the wheelchair to follow the movement of the companion;
  detecting, by the control unit, an undesirable object in a path of movement of the wheelchair; and
  inhibiting, by the control unit, the autonomous control of the at least one actuator.

16. The method of claim 15, wherein the actuation of the at least one actuator to drive the one or more wheels to follow the movement of the companion is an autonomous control.

* * * * *

UNITED STATES PATENT AND TRADEMARK OFFICE
CERTIFICATE OF CORRECTION

| | |
|---|---|
| PATENT NO. | : 11,896,536 B2 |
| APPLICATION NO. | : 17/091559 |
| DATED | : February 13, 2024 |
| INVENTOR(S) | : Dario Jose Villarreal Suarez et al. |

It is certified that error appears in the above-identified patent and that said Letters Patent is hereby corrected as shown below:

In the Specification

In Column 8, Line(s) 02, after "Non-limiting", delete "surface" and insert --surfaces--, therefor.

Signed and Sealed this
Sixteenth Day of April, 2024

*Katherine Kelly Vidal*

Katherine Kelly Vidal
*Director of the United States Patent and Trademark Office*